United States Patent
Jaeger

(10) Patent No.: US 11,459,133 B2
(45) Date of Patent: Oct. 4, 2022

(54) METHOD OF ALIGNING A SPACECRAFT FRAME

(71) Applicant: NOVAWURKS, INC., Los Alamitos, CA (US)

(72) Inventor: Talbot Jaeger, Los Alamitos, CA (US)

(73) Assignee: NOVAWURKS, INC., Los Alamitos, CA (US)

(*) Notice: Subject to any disclaimer, the term of this patent is extended or adjusted under 35 U.S.C. 154(b) by 784 days.

(21) Appl. No.: 16/406,932

(22) Filed: May 8, 2019

(65) Prior Publication Data

US 2020/0354091 A1 Nov. 12, 2020

(51) Int. Cl.
*B64G 1/64* (2006.01)

(52) U.S. Cl.
CPC .................... *B64G 1/646* (2013.01)

(58) Field of Classification Search
CPC . B64G 1/646; B64G 1/66; B64G 1/64; B64G 2001/1092; B64G 1/402; B64G 1/641
See application file for complete search history.

(56) References Cited

U.S. PATENT DOCUMENTS

| | | | |
|---|---|---|---|
| 4,228,976 A | 12/1980 | Eiselbrecher et al. | |
| 4,481,778 A | 11/1984 | Reinker et al. | |
| 4,508,404 A | 4/1985 | Frawley | |
| 4,749,157 A * | 6/1988 | Neufeld | G01P 21/00 |
| | | | 244/164 |
| 4,799,476 A | 1/1989 | McGrady | |
| 4,976,399 A | 12/1990 | Bay et al. | |
| 5,005,786 A * | 4/1991 | Okamoto | B64G 1/646 |
| | | | 244/172.4 |

(Continued)

FOREIGN PATENT DOCUMENTS

| | | |
|---|---|---|
| CN | 2585382 B2 | 2/1997 |
| CN | 102975867 A | 3/2013 |
| EP | WO2005/118394 | 12/2005 |

OTHER PUBLICATIONS

Cook et al, "ISS Interface Mechanisms and their Heritage", 2011. (Year: 2011).*
McManamen, "Taking a Risk to Avoid Risk", 2011. (Year: 2011).*

*Primary Examiner* — Andrew Schechter
*Assistant Examiner* — Jeremy A Delozier
(74) *Attorney, Agent, or Firm* — David Duckworth; One LLP

(57) ABSTRACT

A method is provided for realigning or relieving mechanical stress in a spacecraft frame. The process includes providing a spacecraft which includes at least two frame subsections connected by a mechanical connector. The mechanical connector provides both a soft dock connection which mechanically connects the two frame subsections but allows relative movement between the two frame sections and a hard dock connection which mechanically connects the two frame subsections but does not allow relative movement between the two frame sections. Once in space, a controller causes the mechanical connector to transition from a hard dock connection to a soft dock connection, which is maintained for a predetermined time period to realign or relieve stress within the spacecraft frame. Thereafter, the controller causes the mechanical connector to transition from the soft dock connection back to the hard dock connection.

7 Claims, 6 Drawing Sheets

(56) References Cited

U.S. PATENT DOCUMENTS

| | | | |
|---|---|---|---|
| 6,330,093 B1 | 12/2001 | Eller et al. | |
| 7,478,782 B2 | 1/2009 | Huang et al. | |
| 8,006,937 B1 | 8/2011 | Romano et al. | |
| 9,231,323 B1 | 1/2016 | Jaeger | |
| 2002/0164204 A1 | 11/2002 | Kaszubowski et al. | |
| 2004/0231545 A1 | 11/2004 | Lloyd | |
| 2006/0016935 A1 | 1/2006 | Jordan et al. | |
| 2007/0029446 A1 | 2/2007 | Mosher et al. | |
| 2012/0000575 A1 | 1/2012 | Yandle et al. | |
| 2013/0149894 A1 | 6/2013 | Woydack | |
| 2013/0263441 A1 | 10/2013 | Boncyk et al. | |
| 2016/0236801 A1* | 8/2016 | Jaeger | B64G 1/425 |

\* cited by examiner

METHOD OF ALIGNING A SPACECRAFT FRAME

This invention was made with government support under contract no. HR0011-14-C-0023 awarded by the Defense Advanced Research Projects Agency. The government has certain rights in the invention.

BACKGROUND OF THE INVENTION

The present invention relates generally to spacecraft engineering and design. More particularly, the present invention relates to a method of realigning a spacecraft frame or relieving stress within a spacecraft frame, while in space. The present invention also relates to the activation and deactivation of structural connectors of spacecraft modules.

A spacecraft experiences substantial tensile, compressive and shearing stresses during its launch to orbit which can have a detrimental effect on the spacecraft's frame. In addition, a spacecraft undergoes additional cyclic tensile, compressive and shearing stresses once in space due thermal fluctuations caused by the spacecraft's rotation relative to the sun, and due to vibration, such as produced by the rotation of momentum wheels and control moment gyros. The movement and rotation of a spacecraft payload and the deployment of a spacecraft's solar panels can also induce minor stress into the spacecraft frame. Individually or cumulatively, these stresses can cause the alignment of the spacecraft's structural members to change which, in turn, can induce stress within the spacecraft's structural members or have detrimental effects on the orientation of the spacecraft payload. Unfortunately, there is no known method of relieving the stress within the spacecraft's structural members or of realigning the structural members in the event that they have become misaligned.

Modular spacecraft, homogenous cellular spacecraft, and CubeSats and the like are particularly prone to having components shift in space. Modular spacecraft are attempts to transition away from custom designed spacecraft toward multi-use designs and mass production in an effort to reduce the cost of spacecraft development. A modular spacecraft includes a bus structure which provides a general-purpose spacecraft platform. Various payloads can be mounted to the spacecraft platform utilizing a standard structural, fuel and electric interface. Again, the mechanical connector is of paramount importance.

Even more recently, spacecraft have been designed by combining homogeneous cells. Each cell possesses the traditional architecture of a spacecraft including structure, power, fuel, attitude control and determination, satellite processing, etc. Each cell is substantially identical so as to be manufactured inexpensively and quickly. These cells are combined to create larger and larger platforms to support payload functions such as communications and surveillance. Though there is substantial redundancy by each cell incorporating all spacecraft sub-system capabilities, the extra costs are more than made up for by mass production savings and rapid assembly. Of course, the satellite reconfigurable cell concept also requires that cells be interconnected by a structural, fluid and electrical interface.

CubeSats are a class of small satellites that use a standard size and form factor. The standard CubeSat size uses a "one unit" or "1 U" measuring 10×10×10 cm. To form larger spacecraft, two or more CubeSat modules are connected prior to launch to form a spacecraft of larger sizes such as 2, 3, 6, and even 12 U.

There are now several companies that provide off-the-shelf exoskeleton structures (often called frames or chassis) which mechanically encompass the CubeSat modules. Most of the frames are machined from 6061-T6 or 7075 aluminum and are designed with several mounting locations for mounting components in an attempt to offer configuration flexibility for spacecraft designers. 1 U, 3 U and 6 U sized frames are mose prevalent; however, 12 U frames are available as well. The structural designs come are either: 1) formed from a solid block of aluminum, or 2) those assembled from multiple frames. There are pros and cons associated with each design approach. Solid body designs tend to be lighter and more rigid because they do not experience concentrated stresses due to fasteners during assembly. However, forming thin shapes from solid blocks of aluminum can leave residual internal stresses in the structure, which can be difficult to detect.

Unfortunately, due to the higher number of attachment points, components within and upon the frames of modular, homogenous and CubeSat satellites can become misaligned due to the environmental factors described above. Also, there is no known manner of realigning a spacecraft's frame or adjusting the position of spacecraft's modules once the spacecraft is in space.

Thus, there is a need for a method and apparatus for relieving mechanical stress within a spacecraft frame.

There is also a need for a method and apparatus for realigning the structural components of a spacecraft frame.

SUMMARY OF THE INVENTION

The present invention addresses the aforementioned disadvantages by providing a method of realigning or relieving stress within a spacecraft frame. The spacecraft includes a frame having at least two frame subsections, wherein the term "frame" is intended to be interpreted broadly to include any structure or housing of two units to be connected. The frame subsections are connected by a mechanical connector which connects the two frame subsections. Where the spacecraft includes more than two frame subsections, preferably each subsection is connected by the mechanical connector. Importantly, the mechanical connector is capable of providing both a soft dock connection and a hard dock connection between the two frame subsections. The soft dock connection mechanically connects the two frame subsections, but allows relatives movement between the two frame sections. Conversely, the hard dock connection mechanically connects the two frame subsections, but does not allow relative movement between the two frame sections. Where the spacecraft includes more than two frame subsections, preferably each subsection is connected by a mechanical connector which is capable of providing both a soft dock connection and a hard dock connection.

To control the selective activation of a hard dock connection or soft dock connection, the mechanical connector is connected to one or more control processors, referred to herein as a controller. The controller may be a general purpose computer or microprocessor including hardware and software as can be determined by those skilled in the art to provide automated or directed control of mechanical connector. Preferably, but not necessarily, the spacecraft includes a sensor for determining whether spacecraft frame is aligned or misaligned, or determines whether the spacecraft frame is undergoing strain, which in turn indicates the spacecraft frame is undergoing mechanical stress.

It is anticipated that the spacecraft will be launched while the one or more mechanical connectors are in a hard dock connection. However, due launch vibration, payload vibration, or thermal effects in space, etc., the spacecraft frame alignment may change for which realignment is preferred. Misalignment of the spacecraft may be detected by an alignment/stress sensor. Alternatively, such as where the spacecraft does not possess such a sensor, the spacecraft may undergo periodic maintenance realignment procedures.

To realign the spacecraft frame and/or relieve stress within the spacecraft frame while the spacecraft is in space, the controller causes one or more of the mechanical connectors to transition from the hard dock connection to the soft dock connection. The mechanical connector is maintained in a soft dock connection for a predetermined time period to realign or relieve stress within the spacecraft frame. The soft dock connection may last any length of time as can be determined by one skilled in the art, such as a few milliseconds to ten (10) seconds or longer. Thereafter, the controller causes the mechanical connector to transition from the soft dock connection back to the hard dock connection.

The alignment/stress sensor may be of any type as can be determined by one skilled in the art for determining structural alignment or mechanical strain. A first preferred alignment/strain sensor is simply a strain gauge affixed to the spacecraft frame or affixed to a mechanical connector which transmits deformation measurements to the controller. An alternative preferred alignment/strain sensor includes one or more star trackers located at one or more locations on the spacecraft frame. A star tracker is an optical sensor that measures the positions of stars using photocells or a camera. Since positions of many stars have been measured to a high degree of accuracy, a star tracker may be used to determine the orientation (or attitude) of the spacecraft with respect to the stars. In order to do this, the star tracker must obtain an image of the stars, measure their apparent position in the reference frame of the spacecraft, and identify the stars so their position can be compared with their known position from a star catalog. Meanwhile, to use the star trackers to sense frame alignment (or possible frame stress), the measurements of a plurality of start trackers are compared, and any shift in spacecraft orientation (or attitude) of a first star tracker's measurements relative to a second star tracker's measurements indicates that the frame alignment has changed.

The mechanical connector can be any connector which can be automatically or remotely controlled to switch from a hard connection to a soft connection, and back to a hard connection. A simple connector could consist of a bolt that can be remotely loosened, such as by a motor, and then tightened again by the motor. In the preferred embodiment, the mechanical connector includes a pair of male connector assemblies affixed to a first frame subsection and a pair of mating female mounting connector assemblies affixed to a second frame subsection. Each of the male connector assemblies include a pneumatically controlled piston, and each of the first and second male connector assemblies are mounted to the first frame subsection in outwardly facing coaxially aligned relationship to one another such that extension of both of the pistons causes the pistons to move axially outward and away from each other, and retraction of the pistons causes the pistons to move axially inward and toward each other.

Conversely, each of female connector assemblies possess a receptacle sized for receipt of a male connector assembly piston. The first and second female connector assemblies are mounted to the second frame in an inwardly facing coaxially aligned relation to one another wherein the female connector assemblies' central bores define the same axis. Furthermore, the first and second female connector assemblies are mounted to the second frame subsection in an inwardly facing relationship and spacing so as to accept the male connector assemblies between the female connector assemblies when the male connector assembly pistons are fully retracted. However, the male and female connector assemblies are spaced to lock together when the male connector assembly pistons have been pneumatically made to extend and project into the female connector assembly's receptacles.

Importantly, the mechanical connectors are capable of providing a hard dock connection by extending the male assembly pistons to fully extended positions wherein the pistons engage their corresponding female connector assembly. Furthermore, the mechanical connectors are capable of providing a soft dock connection by only partially retracting each piston so that the pistons no longer physically engage a female connector assembly, but each piston remains partially within a corresponding receptable. Thus, when in a soft dock condition, meaning the pistons have been partially retracted, a first spacecraft frame subsection can move slightly relative to a second spacecraft frame subsection, but the frame sections will not disengage. The extension and retraction of the piston can be controlled by various mechanical apparatus as can be determined by those skilled in the art. However, in a preferred embodiment, the position of the piston is controlled by a helical spring, pneumatic extension and electromagnetic retraction.

Preferably more and more homogenous satellite cells are combined utilizing the mechanical connectors of the present invention to create a larger spacecraft comprised of more and more frame subsections. To form a satellite of homogenous cells, two spacecraft homogeneous cells are connected by a mechanical connector including two male connector assemblies and two female connector assemblies. The first and second male connector assemblies are mounted to a first homogenous satellite cell in an outwardly facing coaxially aligned relation to one another. More specifically, each male connector assembly's central bore and piston have the same central axis and the male connector assemblies are mounted to the first homogenous satellite cell in an opposing relation to one another such that extension of the pistons causes the pistons to move axially outward from one another, and retraction of the piston causes them to move axially inward toward each other.

Meanwhile, the first and second female connector assemblies are mounted to a second homogenous satellite cell. Like the male connector assemblies, the female connector assemblies are mounted to the homogenous satellite cell in a manner wherein their central bores are coaxially aligned. However, instead of facing outward, the female connector assemblies are mounted to the second spacecraft in an inwardly facing relationship to one another. Furthermore, the female connector assemblies are mounted so as to be spaced so as to receive the two male connector assemblies, mounted to the first spacecraft, between the female connector assemblies when the male connector assembly pistons are in a retracted condition. However, the female connector assemblies are mounted to the second spacecraft so as to be sufficiently close together that the male connector assemblies and female connector assemblies will lock together when the male connector assembly pistons have projected into an extended position with the pistons projecting into the female connector assembly receptacles. More specifically, the male and female connector assemblies form mechanical connectors when the male connector assembly pistons are extended into the female connector assembly receptacles so as to engage an O-ring concentrically positioned within the female connector assembly's central bores.

Advantageously, the satellite's framework (comprised of homogenous cells) can be realigned and/or have mechanical stress relieved within the spacecraft framework while the spacecraft is in space. To accomplish this, the controller causes one or more of the mechanical connectors to transition from the hard dock connection to the soft dock connection. After the one or more mechanical connectors have maintained a soft dock connection for a predetermined time period the controller causes the mechanical connector to transition from the soft dock connection back to the hard dock connection.

Advantageously, it is an object of the present invention to provide a method of realigning the structural components of a spacecraft frame while the spacecraft is in space.

In addition, it is an object of the present invention to provide a method of relieving stress within the structural components of a spacecraft frame while the spacecraft is in space.

Other features and advantages of the present invention will be appreciated by those skilled in the art upon reading the detailed description which follows with reference to the attached drawings.

DETAILED DESCRIPTION OF THE INVENTION

Figure 1:
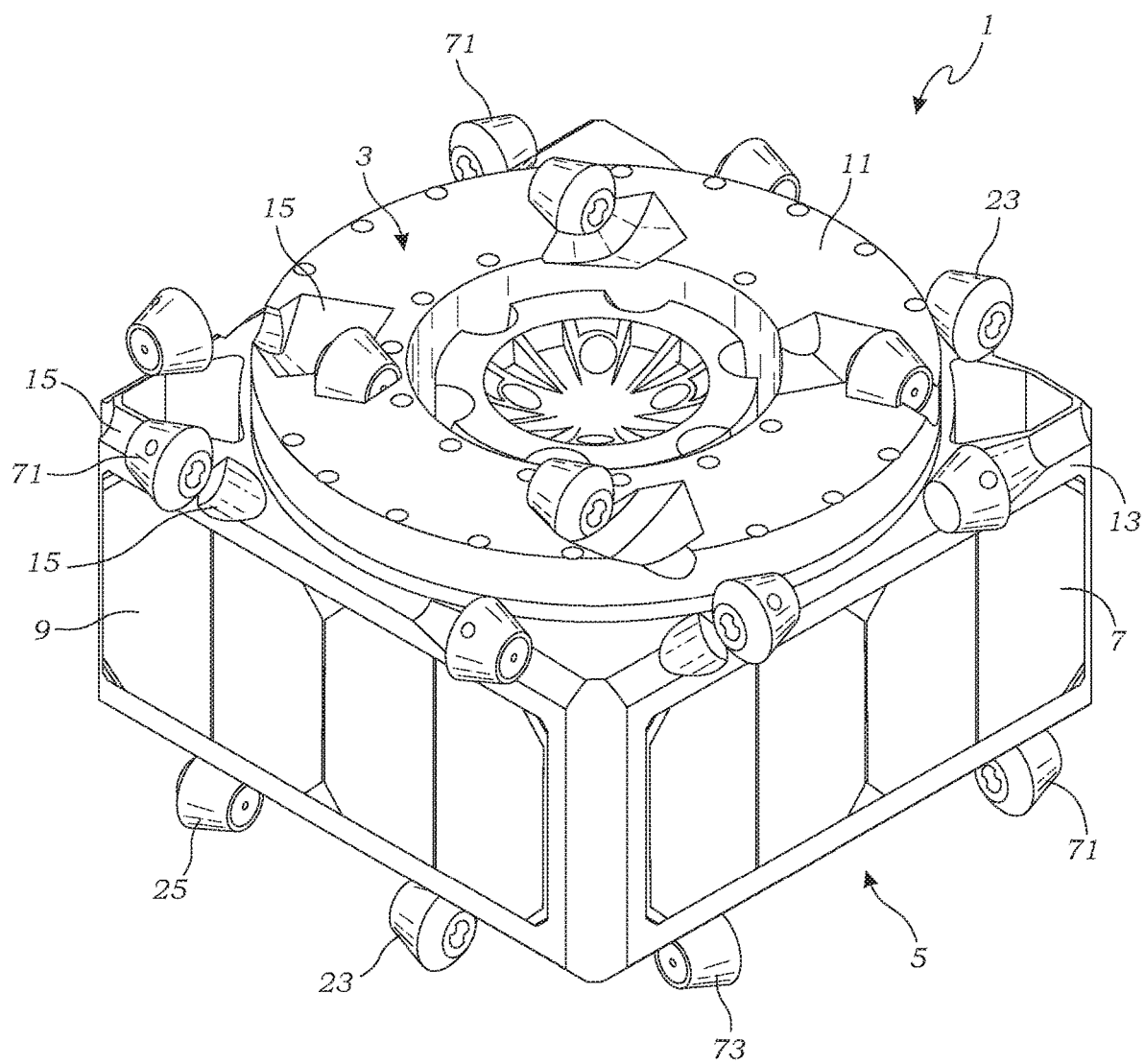
FIG. 1 is a perspective view of a spacecraft homogenous cell incorporating traditional spacecraft architecture with a plurality of unmated male and female connector assemblies.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 2:
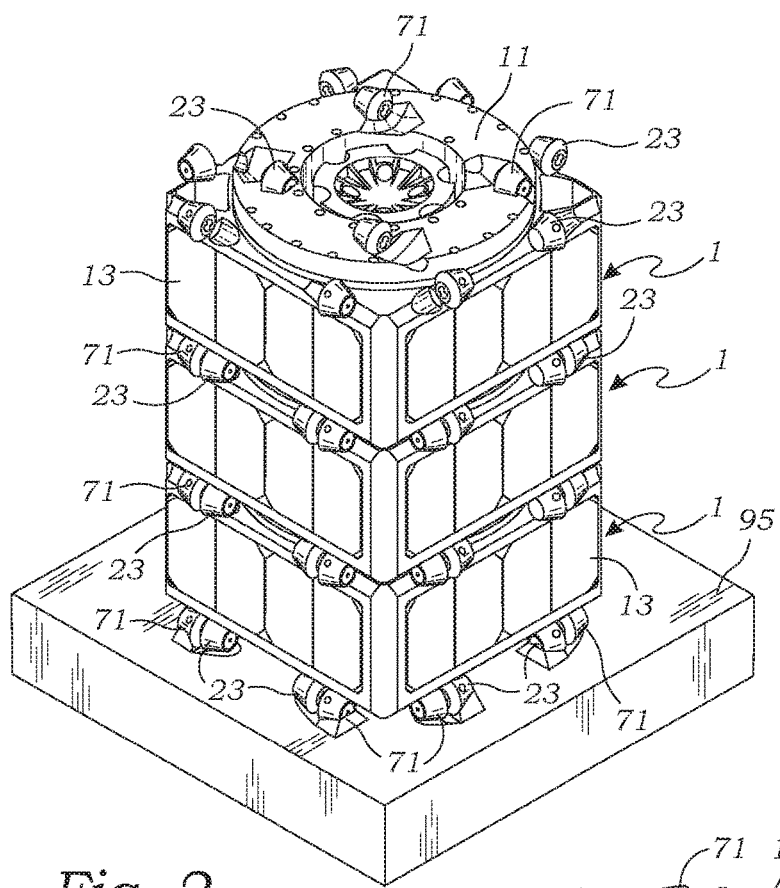
FIG. 2 is a perspective view illustrating three (3) homogenous spacecraft cells connected in a stacked condition utilizing the mechanical connectors.
Figure 3:
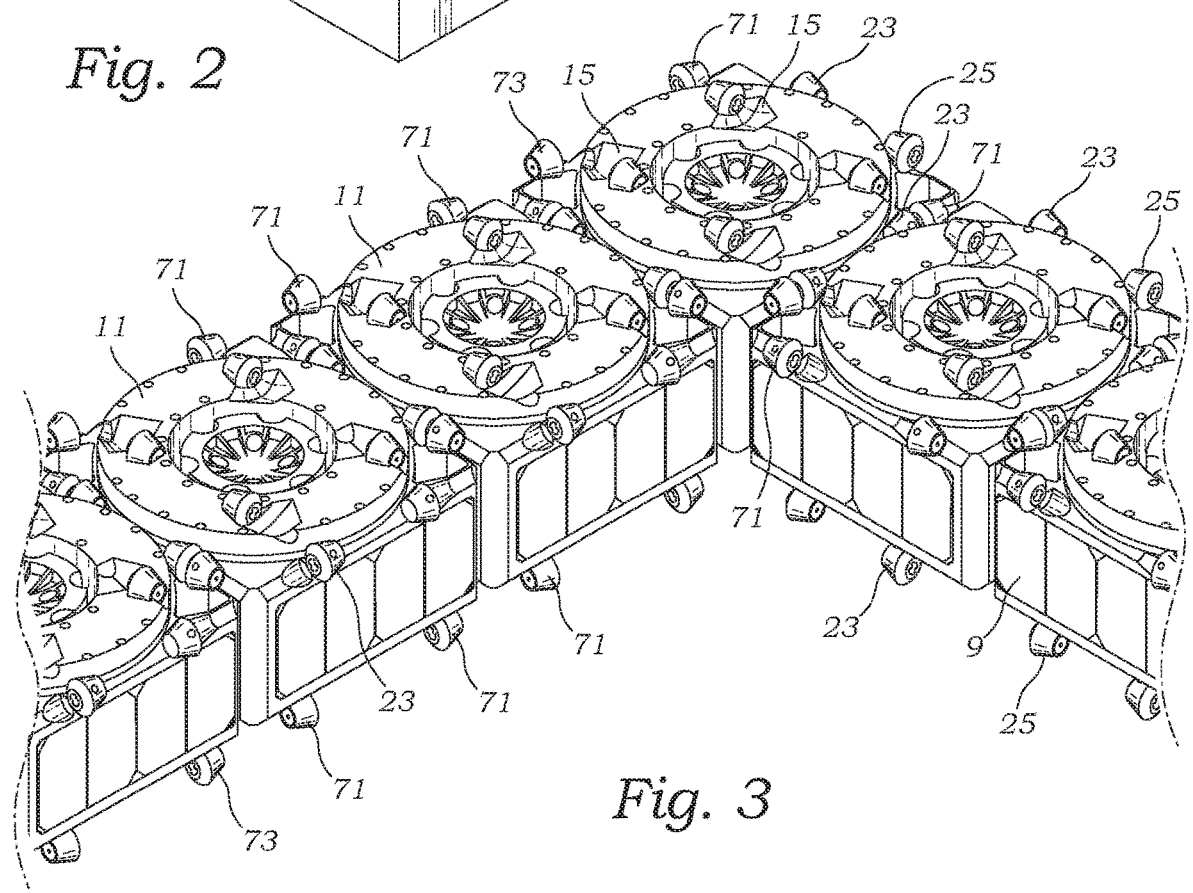
FIG. 3 is a top perspective view illustrating six (6) homogenous spacecraft cells connected side-by-side utilizing the mechanical connectors.
Figure 9:
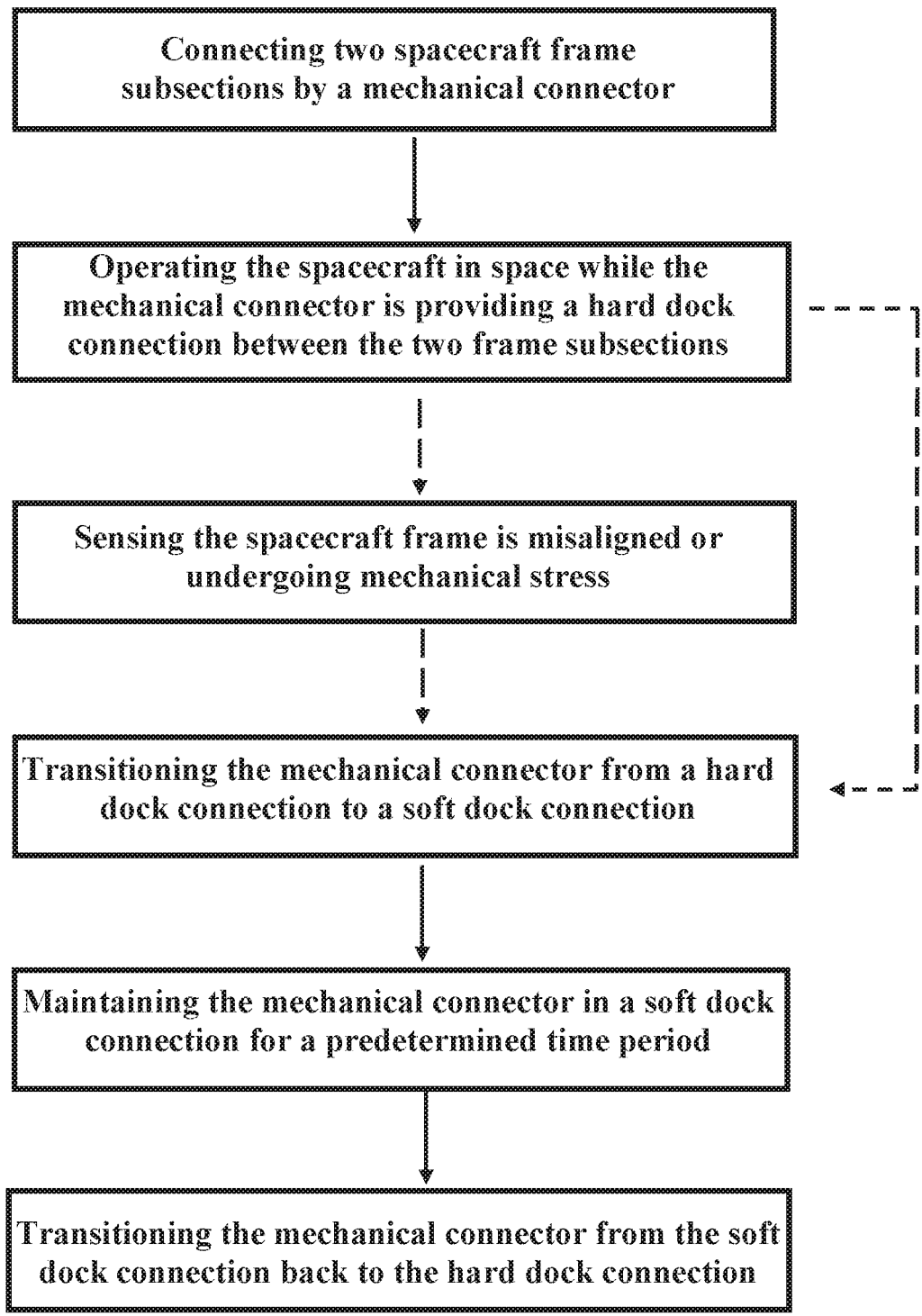
FIG. 9 is a flow chart illustrating the method of realigning a spacecraft frame while the spacecraft is in space.

With reference to FIG. 9, a method is provided for realigning or relieving stress within a spacecraft frame. The spacecraft includes a frame having at least two frame subsections 1. With reference also to FIGS. 1-8, the method of realigning or relieving stress within a spacecraft frame is believed to have particular application for realigning a spacecraft comprised of a plurality of homogeneous spacecraft cells 1 which are connected by mechanical connectors 21. As illustrated in FIGS. 1-3 a preferred homogenous spacecraft cell 1 has a top 3, a bottom 5, and four sides 7. The homogenous cell may include one more solar panels 9 and one or more momentum wheels 11. In addition, the spacecraft cell 1 has a housing 13 forming a frame upon which the mechanical connectors 21 are mounted.

The frame subsections 1, also referred to herein as homogenous cells, are connected by a mechanical connector which connects two frame subsections. Where the spacecraft includes more than two frame subsections, preferably each frame subsection is connected to another frame section by one or more mechanical connectors. Importantly, each mechanical connector is capable of providing both a soft dock connection and a hard dock connection between the two frame subsections. The soft dock connection mechanically connects the two frame subsections but allows relative movement between the two frame sections. Conversely, the hard dock connection mechanically connects the two frame subsections but does not allow relative movement between the two frame sections. Where the spacecraft includes more than two frame subsections, preferably each subsection is connected by a mechanical connector which is capable of providing both a soft dock connection and a hard dock connection.

To control the selective activation of a hard dock connection or soft dock connection, the mechanical connector is connected to one or more control processors. Preferably, but not necessarily, the spacecraft includes a sensor for determining whether the spacecraft frame is aligned or misaligned, or determines whether the spacecraft frame has undergone mechanical strain, which in turn indicates the spacecraft frame is undergoing mechanical stress.

The preferred mechanical connector 21 for providing both a hard dock connection and a soft dock connection includes a male connector assembly 23 and a female connector assembly 71. As best illustrated in FIGS. 1-3, the male connector assembly 23 has a tapered housing 25. The housing's tapered shape is considered ideal for in-space rendezvous and docking so as to self-align when received by correspondingly shaped beveled recesses 15 formed upon another homogenous spacecraft cell. As illustrated in FIGS. 4-8, the male connector assembly's housing 25 may include a removable insert 26 for allowing the installation and removal of the remaining connector assembly components from within the male connector assembly's housing. O-rings 57 may be provided between the housing's insert 26 and exterior tapered portion of the housing so as to affix the insert 26 in place.

As illustrated in FIGS. 4-8, the male connector assembly 23 includes a central bore 27. Preferably, the cylindrical bore has a circular cross-section. As illustrated in the Figures, the central bore has a smaller diameter towards its proximal end 29 and a larger diameter at its distal end 31. Furthermore, the male connector assembly's central bore is connected to a fuel source such as by a fuel line 33 which radially projects through the connector assembly's housing towards the central bore's proximal end.

The male connector assembly 23 also includes a piston 37. As illustrated in the Figures, a preferred piston is manufactured to include two components including a smaller diameter shaft 38 and a larger diameter piston head 39. Preferably, the piston head 39 has a diameter sufficiently large to form a substantially gaseous tight seal within the central bore 27. Furthermore, the piston may include an O-ring concentrically positioned around the piston head to form a gaseous tight seal between the piston head and the cylindrical surface of the central bore 27. Advantageously, the difference in diameter between the piston's shaft 38 and piston head 39 provides the piston head with a circular collar region 47. The smaller diameter shaft 38 slidably resides within the smaller proximal end 29 of the central bore 27. Meanwhile, the larger diameter piston head 39 slidably resides in the larger distal end 31 of the central bore 27. The piston 37 includes a central conduit 40 which extends the entire length of the piston through the shaft 38 and piston head 39. Preferably, the piston head 39 includes a divergent nozzle 43 forming the distal end of the central conduit 40.

The male connector assembly's piston 37 is capable of moving proximally and distally within the central bore 27. Movement of the piston can be actuated by various electrical or mechanical apparatus known to those skilled in the art. The preferred mechanical connector 21 includes a piston which is projected distally using pneumatic actuation, but moved proximally using an electromagnetic actuator. Moreover, it is preferred that the piston be maintained in a neutral central position by a helical spring 35 when not actuated proximally or distally.

Figure 4:
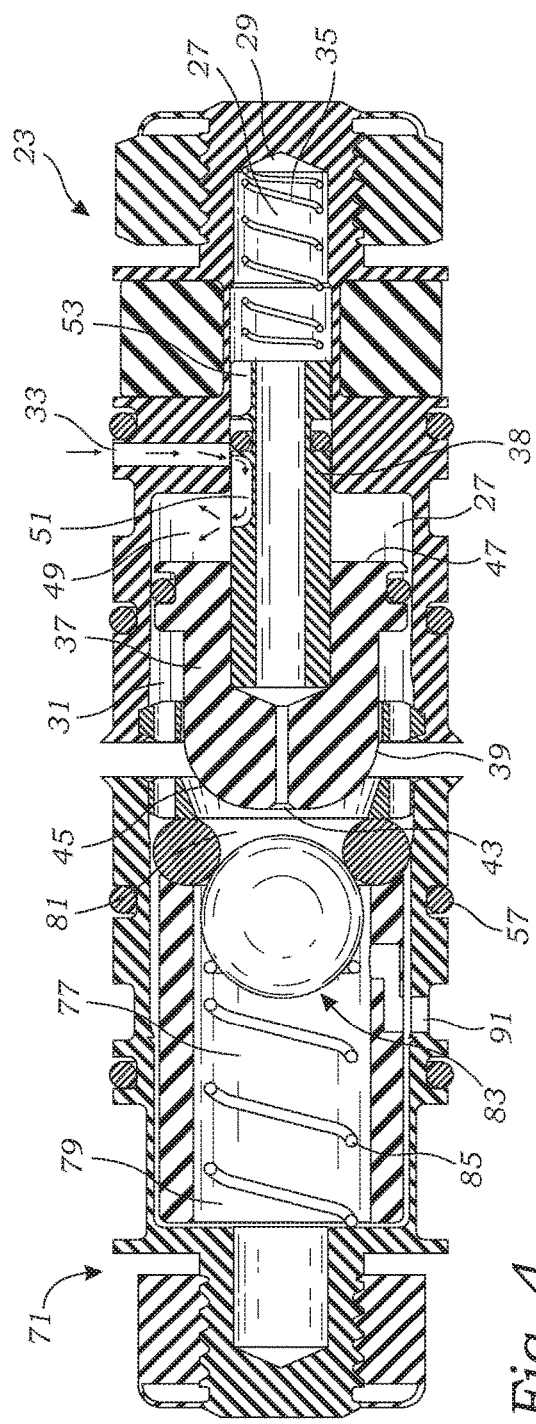
FIG. 4 is a side cut-away view of the male and female connector assemblies of the mechanical connector wherein the male connector assembly piston is being actuated from a soft dock condition to an extended locking condition.
Figure 5:
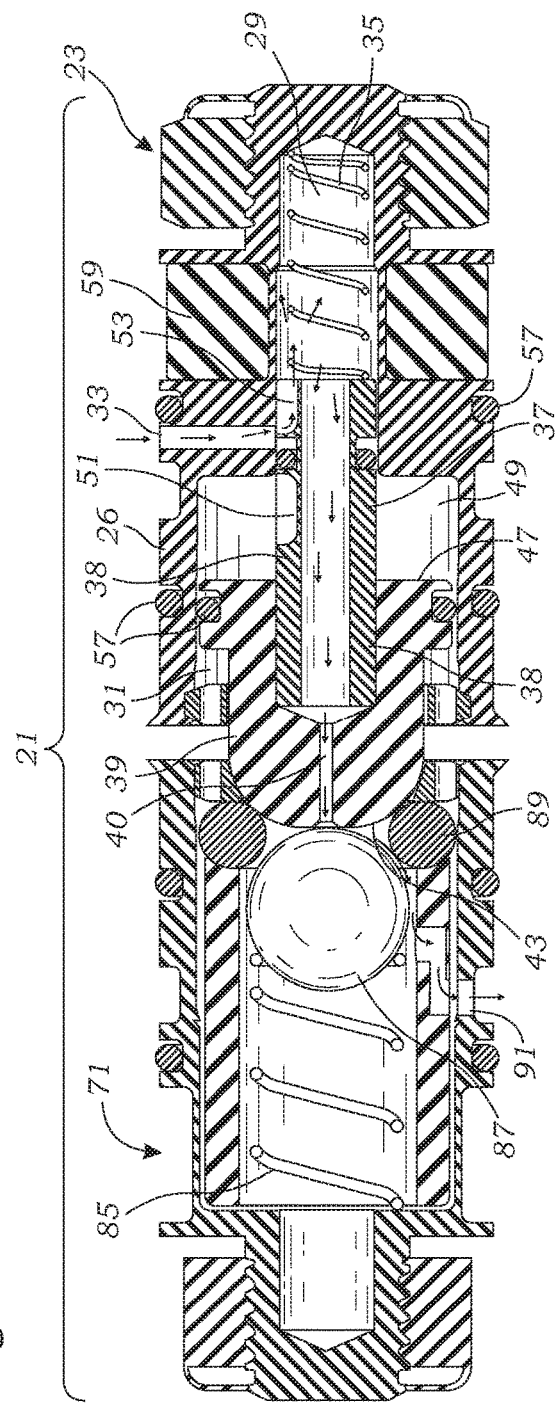
FIG. 5 is a side cut-away view of the male and female connector assemblies of the mechanical connector wherein the male connector assembly piston has been extended so as to lock male and female connector assemblies together.
Figure 6:
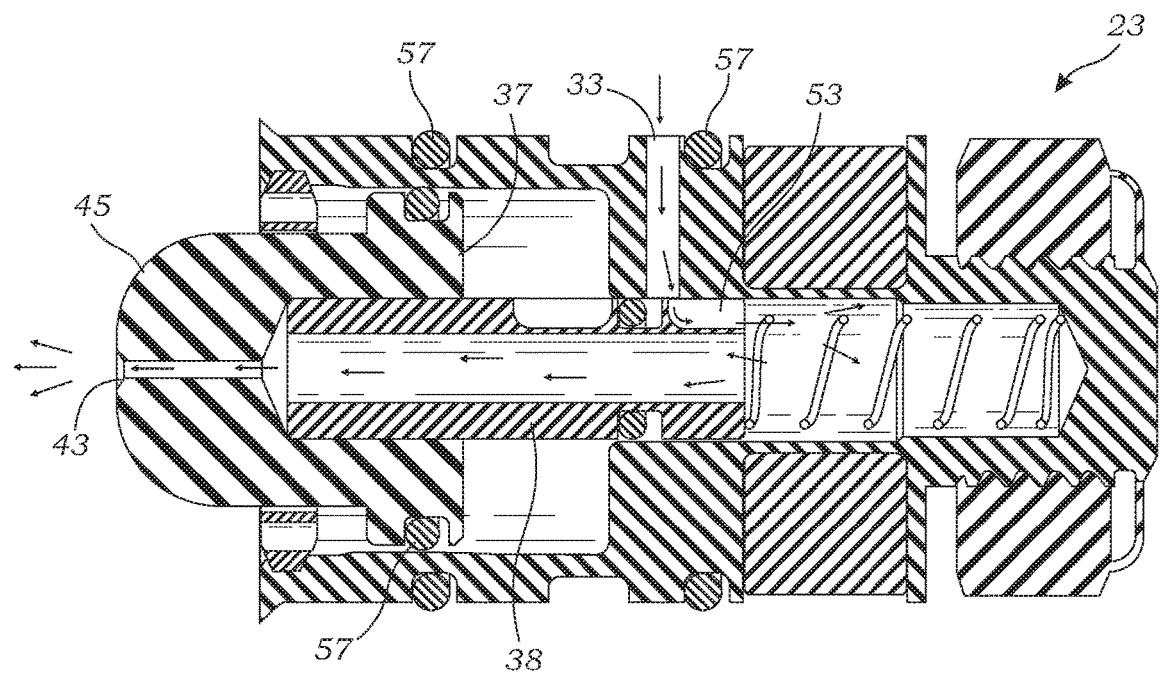
FIG. 6 is a side cut-away view of a male connector assembly wherein the piston has been extended and propellant is being ejected from the piston's distal nozzle.

To enable the piston 37 to be pneumatically extended, the piston shaft 38 has a first channel 51 which extends from the fuel line 33 into a chamber 49 formed behind the piston's collar 47 when the piston is in a neutral "soft dock" position. As illustrated in FIG. 4, the release of propellant through the fuel line 33, such as by opening a fuel valve (not shown), allows propellant to flow through the first channel 51 into chamber 49 so as to pneumatically force the piston distally. As illustrated in FIG. 5, the piston is forced distally until the first channel 51 is no longer in fluid communication with the fuel line 33. Preferably an O-ring 57 is provided to provide a fluid tight seal so as to prevent further propellant passing through the first channel 51 into chamber 49.

As illustrated in FIGS. 4-8, preferably the piston shaft 38 further includes a second channel 53 which comes into fluid communication with the fuel line 33 when the piston has been extended to a distal position. As illustrated in FIG. 5, the second channel 53 connects the fuel line 33 with the male connector assembly's central bore 27 at the central bore's proximal end 29 so as to allow propellant to flow through the fuel line into the central bore 27, and thereafter through the piston's central conduit 40, so as to be ejected from the piston's distal end 43.

Figure 7:
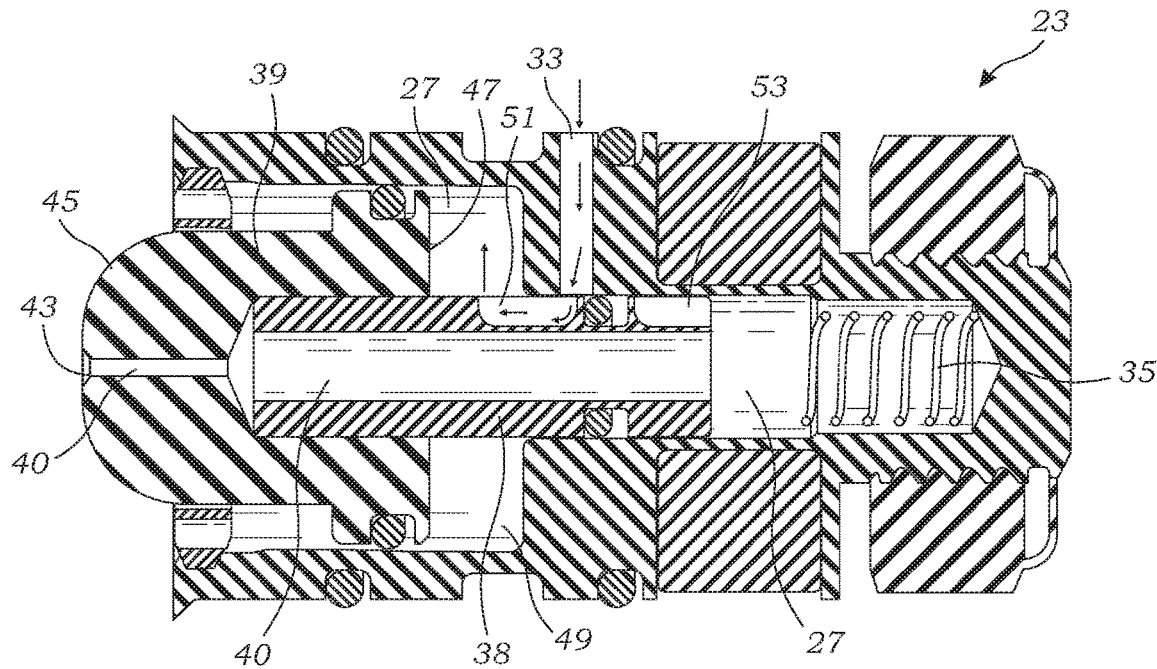
FIG. 7 is a side cut-away view of a male connector assembly wherein the male connector assembly's piston is being actuated from a soft dock condition to an extended condition.
Figure 8:
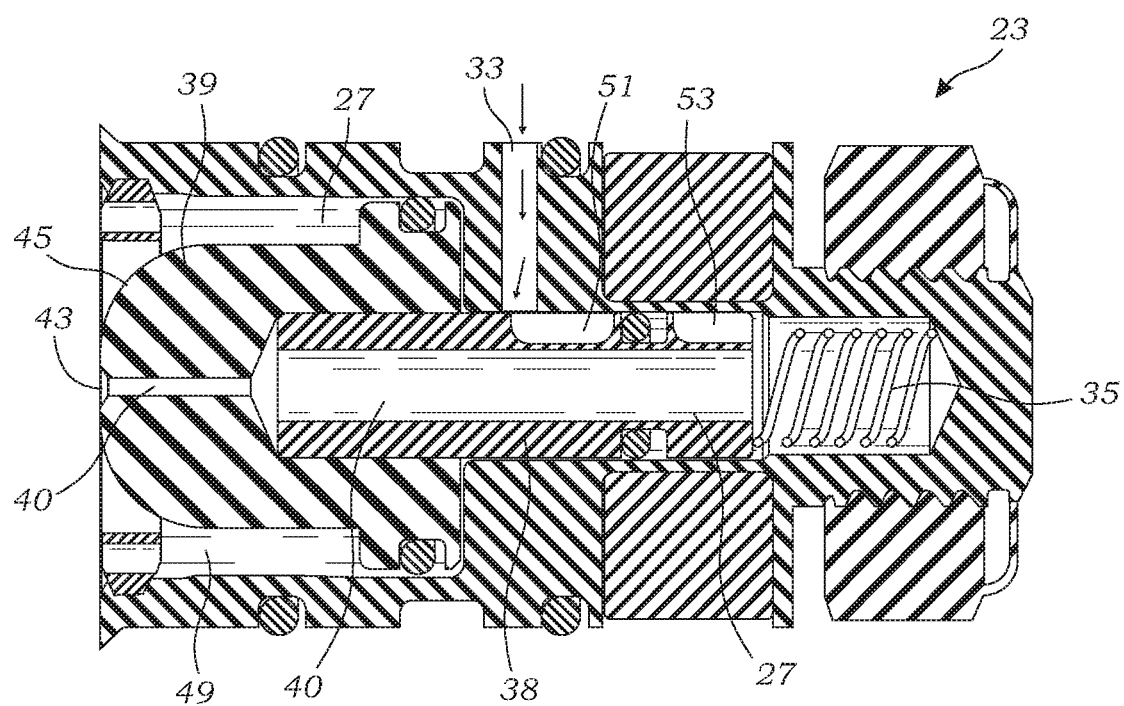
FIG. 8 is a side cut-away view of the male connector assembly wherein the male connector assembly's piston has been retracted.

To move the piston 37 in the proximal direction, the male connector assembly 23 includes a magnetic actuator including an electrical magnetic field generator, such as a coil winding 59 concentrically positioned around the piston's shaft 38. As understood by those skilled in the art, incorporating magnetic properties into the shaft 38 in cooperation with a controllable electromagnetic field provided by the magnetic field actuator 59 will cause the piston 37 to move in the proximal direction such as illustrated in FIG. 7.

As illustrated in each of the Figures, the mechanical connector 21 also includes a female connector assembly 71 intended to connect with the male connector assembly 23. The female connector assembly 71 includes a tapered housing 73 which is also sized to be received and aligned within beveled recesses 15 formed within a homogenous spacecraft cell's housing 13. Preferably the female connector assembly's housing also includes an insert 75 for allowing the connector assembly components to be easily installed and removed.

As illustrated in FIGS. 4 and 5, the female connector assembly includes a central bore 77 having a proximal end 79 and a distal end 81. The distal end is closeable by a ball valve 83. The ball valve includes a ball 87, an O-ring 89 having an inner diameter smaller than the diameter of the ball, and a helical spring 85 for biasing the ball distally into the O-ring for creating a fluid tight seal. As understood by those skilled in the art, the helical spring 85 maintains the ball valve in a normally closed condition. However, movement of the ball 87 in the proximal direction, such as by engagement by a male connector assembly piston 37, will cause the ball valve to open. The female connector assembly further includes a fuel line 91, so that the female connector assembly's central bore 77 is connected to a fuel source (not shown).

As illustrated in FIGS. 4-8, a mechanical connector 21 of the present invention includes both a male connector assembly 23 connected to a female connector assembly 71. In a preferred embodiment, the mechanical connector 21 includes two sets of male and female connector assemblies. As illustrated in FIGS. 1-3, for this embodiment, the first and second male connector assemblies 23 are mounted in an outwardly facing coaxially aligned relationship to one another, such as to a first spacecraft housing 13. More specifically, each male connector assembly's central bore 27 and piston 37 share the same axis and the male connector assemblies are mounted so that each piston extends outward from one another and each piston retracts toward each other. Meanwhile, the female connector assemblies are mounted to a second spacecraft housing in a manner wherein the female connector assembly's central bores are also coaxially aligned. However, the female connector assemblies are positioned to be inwardly facing, and aligned and spaced so as to connect with two male connector assemblies.

FIG. 4 illustrates a soft dock connection between a male connector assembly 23 and a female connector assembly 71. The male connector assembly's piston is maintained in a neutral condition by the spring 35. The male piston 37 projects partially into the female connector assembly's receptacle 62, but the piston is not extended so far as to engage the female connector assembly's O-ring 89 so as to form a fluid tight seal. Without introduction of a gas, such as a propellant, into the male connector assembly's chamber 49, the piston 37 can be displaced proximally relatively easily so as to allow engagement or disengagement of the male connector assembly to the female connector assembly. However, as illustrated in FIGS. 5 and 7, the introduction of propellant from fuel line 33 through first channel 51 into the male connector assembly's chamber 49 causes the piston 37 to move distally into the female connector assembly's receptacle 62 so as to engage and form a fluid tight seal with the female connector assembly's O-ring 89. Though not illustrated in the Figures, the piston conduit's distal end has a lateral slit across the divergent nozzle 43 so as to prevent a fluid tight seal between the piston's conduit 40 and the female connector assembly's ball 87. Thus, as illustrated in FIG. 5, when the male connector assembly piston has been moved to a distal "hard dock" position, gas is freely capable of flowing through the male and female connector assemblies, as controlled by a valve connected to the male connector assembly's fuel line 33. As would be understood by those skilled in the art, the opening of this valve causes propellant to flow from the high-pressure region in either the first or second cell, to the low-pressure region in the first or second cell.

As illustrated in FIGS. 1-4, preferably four sets of male and female connector assemblies are used to structurally connect two homogeneous spacecraft cells. Two male connector assemblies 23 and two female connector assemblies 71 are mounted to the side of a first spacecraft. As illustrated, these respective connector assemblies are affixed to opening edges of one side of the spacecraft. Meanwhile, the second homogenous spacecraft cell 1 also includes two male connector assemblies 23 and two female connector assemblies 71 mounted to opposing edges of a spacecraft side. The male connector assemblies are aligned to be outwardly facing and positioned between the female connector assemblies which are inwardly facing. The homogenous cells can be stacked as illustrated in FIG. 2 or positioned side-by-side as illustrated in FIG. 3. Moreover, preferably the homogeneous cells include a carrousel 11 which incorporates reaction wheel, momentum wheel, control moment gyroscope, and/or gimbal capabilities. Preferably, the carousels 11 of adjoining cells can also be externally connected utilized four sets of male and female connector assemblies.

In addition to providing a structural connection, the preferred mechanical connector 21 of the present invention provides a fluid connector so as to allow propulsion fluids to flow from one spacecraft to another, as illustrated in FIG. 5. Finally, the mechanical connector is capable of transmitting power and data. For this embodiment, preferably the female connector assembly's insert portion 75 of housing 73, helical spring 85, and ball 87 are electrically conductive. Conversely, it is preferred that the male connector assembly's insert portion 26 of housing 25, piston 37, and helical spring 35 be electrically conductive. Movement of the piston 37 to a distal position to engage ball 87 provides an electrical connection through the male and female connector assemblies so as to permit the transmission of power and data.

Preferably, the spacecraft includes a sensor (not shown) for determining whether the spacecraft frame is misaligned or the spacecraft frame is experiencing undesirably high mechanical stress. A first preferred alignment/strain sensor is simply a strain gauge affixed to the spacecraft frame or affixed to a mechanical connector which detects mechanical deformation of a structural component such as the spacecraft frame or a mechanical connector. A preferred strain gauge consists of an insulating flexible backing which supports a long, thin conductive strip in a zig-zag pattern of parallel lines. The strain gauge is attached to the spacecraft frame by a suitable adhesive. In the event the spacecraft frame is strained (deformed), the conductive strip is deformed which in turn causes its electrical resistance to change. This resistance change is transmitted to the spacecraft controller which uses the resistance change to determine any strain within the spacecraft frame which is based on the quantity known as the gauge factor.

An alternative preferred alignment/strain sensor includes one or more star trackers (not shown) located at one or more locations on the spacecraft frame. A star tracker obtains an image of the stars, and compares their position to that within a star catalog to provide an apparent reference position of the spacecraft frame. Meanwhile, to use the star trackers to sense frame alignment (or possible frame stress), the measurements of a plurality of start trackers are compared. In the event that the spacecraft orientation (or attitude) as determined by a first star tracker changes relative to a second star tracker's measurements, then the frame alignment has changed.

In still an alternative embodiment, the sensor for detecting misalignment of the spacecraft frame includes a position sensor which detects the position of the piston 37 within the male connector assembly 21. Sensors for determining the position of the piston 37 can be determined by those skilled in the art, but in a preferred embodiment, the position sensor is incorporated within the coil winding 59 that retracts the piston 27 wherein changes in the coil winding's electromagnetic field, as changed by the position of the piston, provides the controller with an indication as to the piston's position. Meanwhile, to determine if the spacecraft frame's alignment has changed, the piston 37 is temporarily retracted and then extended. In the event that the piston's extended position has changed, one is provided with an indication that the spacecraft frame alignment has changed and may be misaligned.

As would be understood by those skilled in the art, the various electro-mechanical components and sensors are connected to the controller. The controller is connected to each of the sensors to receive alignment and/or mechanical stress data. Further, each mechanical connector's electromagnetic actuator 59 is preferably connected to one or more control processors to control the retraction of a piston 37. Controlled retraction of the piston 37 provides automated or directed control of the fuel valve so as to open and close the valve to thereby control the flow of fuel through the male connector assembly and the female connector assembly. Furthermore, the one or more controllers may control the transmission of power and data through the male and female connector assemblies.

In operation, a spacecraft (having at least two subsections connected by one or more mechanical connectors) is launched into space while the mechanical connectors are in hard dock condition. Once in space, the controller causes one or more of the mechanical connectors to transition from a hard dock connection to a soft dock connection to realign the spacecraft frame or relieve stress within the spacecraft frame. The decision to initiate this step may come as a result of sensor data indicating misalignment or stress within the spacecraft frame. Alternatively, the transition to a soft dock condition may be part of periodic spacecraft maintenance to ensure proper spacecraft frame alignment.

With reference to FIG. 4, to transition the preferred mechanical connector 21 to a soft dock connection, the controller causes the piston 37 to move proximally using electromagnetic actuator 59. After the one or more mechanical connectors are transitioned to a soft dock condition, the mechanical connectors are maintained in the soft dock condition (by spring 35 maintaining the piston 37 in a neutral position) for a predetermined time period sufficient to ensure that shifted components can realign to proper placement. Thereafter, with reference to FIG. 5, the controller causes the mechanical connectors 21 to transition back to a hard dock connection by introducing propellant from fuel line 33 into the male connector assembly's chamber 49. The introduction of propellant into the male connector assembly's chamber 49 causes the piston 37 to move distally into the female connector assembly's receptacle 62 so as to engage and form a hard dock connection with the female connector assembly's O-ring 89. Advantageously, once the one or more mechanical connectors 21 have transitioned back to a hard dock connection, the spacecraft frame is back in a rigid configuration wherein the frame has been realigned and/or mechanical stress has been relieved.

While several particular forms of the invention have been illustrated and described, it will be apparent that various modifications can be made without departing from the spirit and scope of the invention. Therefore, it is not intended that the invention be limited except by the following claims.

Having described my invention in such terms so as to enable person skilled in the art to understand the invention, recreate the invention and practice it, and having presently identified the presently preferred embodiments thereof I claim:

1. A method of realigning or relieving stress within a spacecraft frame comprising the steps of:
providing a spacecraft which includes at least two frame subsections;
providing a mechanical connector which connects the at least two frame subsections with the mechanical connector providing both a soft dock connection and a hard dock connection between the two frame subsections, and wherein the soft dock connection mechanically connects the two frame subsections but allows relative movement between the two frame sections, and the hard dock connection mechanically connects the two frame subsections but does not allow relative movement between the two frame sections;
operating the spacecraft in space while the mechanical connector is providing a hard dock connection between the two frame subsections;
causing the mechanical connector to transition from the hard dock connection to the soft dock connection while said mechanical connector is in space; and
maintaining the mechanical connector in a soft dock connection for a predetermined time period while said mechanical connector is in space to realign or relieve stress within the spacecraft frame; and
after maintaining the mechanical connector in a soft dock connection for a predetermined time period while said mechanical connector is in space, causing the mechanical connector to transition from the soft dock connection back to the hard dock connection.

2. A method of realigning or relieving stress within a spacecraft frame of claim 1 further comprising the steps of:
providing the spacecraft with a sensor which senses the misalignment of the at least two frame subsections;
determining, by the sensor, that the at least two frame subsections are misaligned while said spaceraft is in space; and
initiating said step of causing the mechanical connector to transition from the hard dock connection to the soft dock connection while said mechanical connector is in space in the event that the sensor has determined that the at least two frame subsections are misaligned.

3. A method of realigning or relieving stress within a spacecraft frame of claim 2 wherein the sensor includes one or more star trackers.

4. A method of realigning or relieving stress within a spacecraft frame of claim 2 wherein the sensor senses mechanical strain in a structural component of one of the at least two frame subsections.

5. A method of realigning or relieving stress within a spacecraft frame of claim 1 further comprising the steps of:
providing a first of the at least two frame subsections with first and second male connector assemblies, each of the male connector assemblies having a hollow housing forming a central bore having a proximal end and a distal end, each of the first male connector assemblies having a piston positioned within each of the central bores with the pistons being retractable and extendable from the central bores' distal ends, each of the first and second male connector assemblies mounted to the first frame subsection in outwardly facing coaxially aligned relation to one another such that extension of both of the pistons causes the pistons to move axially outward and away from each other, and retraction of the pistons causes the pistons to move axially inward and toward each other; and
providing a second of the at least two frame subsections with first and second female connector assemblies, each of the female connector assemblies having a distal end forming a receptacle sized for receipt and a substantially fluid tight seal with a male connector assembly piston, the first and second female connector assemblies mounted to the second frame subsection in an inwardly facing coaxially aligned relation to one another wherein the female connector assemblies' central bores define the same axis, and the first and second female connector assemblies are mounted to the second frame subsection in an inwardly facing relation and spacing so as to accept the male connector assemblies between the female connector assemblies when the male connector assembly pistons are fully retracted, and the male connector assemblies locking to the female connector assemblies with the male connector assembly pistons projecting into the female connector assembly receptacles when the pistons are extended;
providing the spacecraft with a controller which controls the retraction and extension of the male connector assembly pistons, the controller capable of partially retracting the male connector assembly pistons to provide the soft dock connection and the controller capable or extending the male connector assembly pistons to provide the hard dock connection.

6. A method of realigning or relieving stress within a spacecraft frame of claim 5 further comprising the steps of:
providing the spacecraft with a sensor which senses the misalignment of the at least two frame subsections;
determining, by the sensor, that the at least two frame subsections are misaligned while said mechanical connector is in space; and
initiating said step of causing the mechanical connector to transition from the hard dock connection to the soft dock connection while said mechanical connector is in space in the event that the sensor has determined that the at least two frame subsections are misaligned.

7. A method of realigning or relieving stress within a spacecraft frame of claim 6 wherein the sensor measures the position of one of said male connector assembly pistons.

* * * * *